United States Patent
Bienenfeld et al.

(10) Patent No.: US 12,307,278 B1
(45) Date of Patent: May 20, 2025

(54) INFRASTRUCTURE CREATION BASED ON APPLICATION CODE

(71) Applicant: Amazon Technologies, Inc., Seattle, WA (US)

(72) Inventors: Zachary Adam Bienenfeld, Kiryat Gat (IL); Ilia Gilderman, Bellevue, WA (US); Romain Muller, Metz (FR); Ben Fedidat, Jerusalem (IL); Oded Sharon, Ramat Gan (IL); Eyal Cohen, Shoam (IL); Haim Sharabani, Modiin (IL); Hanna Ben-Moshe, Yehud-Monoson (IL)

(73) Assignee: Amazon Technologies, Inc., Seattle, WA (US)

( * ) Notice: Subject to any disclaimer, the term of this patent is extended or adjusted under 35 U.S.C. 154(b) by 891 days.

(21) Appl. No.: 17/490,817

(22) Filed: Sep. 30, 2021

(51) Int. Cl.
*G06F 9/455* (2018.01)
*G06F 8/71* (2018.01)
*G06F 9/50* (2006.01)

(52) U.S. Cl.
CPC ............ *G06F 9/45558* (2013.01); *G06F 8/71* (2013.01); *G06F 9/5077* (2013.01); *G06F 2009/4557* (2013.01); *G06F 2009/45595* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 11,853,802 B1 * | 12/2023 | Wei | G06F 9/45558 |
| 2023/0048653 A1 * | 2/2023 | Tripathi | G06F 8/76 |

OTHER PUBLICATIONS

Hagara, Michal, "Evaluation of Infrastructure as a Code for Enterprise Automation", Masaryk University Faculty of Informatics. (Year: 2018).*

* cited by examiner

*Primary Examiner* — Qing Yuan Wu
(74) *Attorney, Agent, or Firm* — Knobbe, Martens, Olson & Bear, LLP

(57) ABSTRACT

An automated infrastructure creation service of a service provider network may be used to create infrastructure for a virtual computing environment of the service provider network based on application code. The service identifies a data structure(s) in application code, the application code to be executed in a virtual computing environment of the service provider network, and the service generates a manifest(s) based on the data structure(s) identified in the application code. Infrastructure as code (IaC) can then be executed to create infrastructure for the virtual computing environment based at least in part on the manifest(s). Accordingly, the IaC uses the application code to create infrastructure. In this way, duplicity in the process of developing IaC and application code is reduced, or eliminated, and errors in the respective code bases are mitigated.

20 Claims, 9 Drawing Sheets

INFRASTRUCTURE CREATION BASED ON APPLICATION CODE

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide customers with on-demand delivery of compute power, database storage, applications, and other resources, rather than the customers having to make upfront investments in hardware and spend time and resources managing the hardware.

Infrastructure as code (IaC) is used to programmatically create infrastructure for a virtual computing environment of a service provider network. The "code" in IaC can be organized as discrete definitions for each infrastructure component. A processor executes this code to rapidly create the infrastructure for a virtual computing environment. Creating infrastructure in this manner may include creating computing resources, determining permissions, and so on. A developer is able to then write application code that uses the infrastructure created by the IaC. However, there is often duplication in this process because at least two descriptions of the same computing resource(s) are made independently of one another. That is, a developer may provide a first description of a computing resource in the IaC, and a second description of the same computing resource in the application code that utilizes the computing resource. This is not only inefficient, but it is error prone. For example, the developer may provide a particular index for a database resource in the application code that is used to query data, but that particular index may not have been provided in the IaC. This inconsistency can cause an incompatibility between the application code and the infrastructure used by the application code, potentially rendering the application inoperable (e.g., causing the application to crash). Because these duplications can permeate through a service provider network, the issues noted above can become widespread.

The disclosure made herein is presented with respect to these and other considerations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
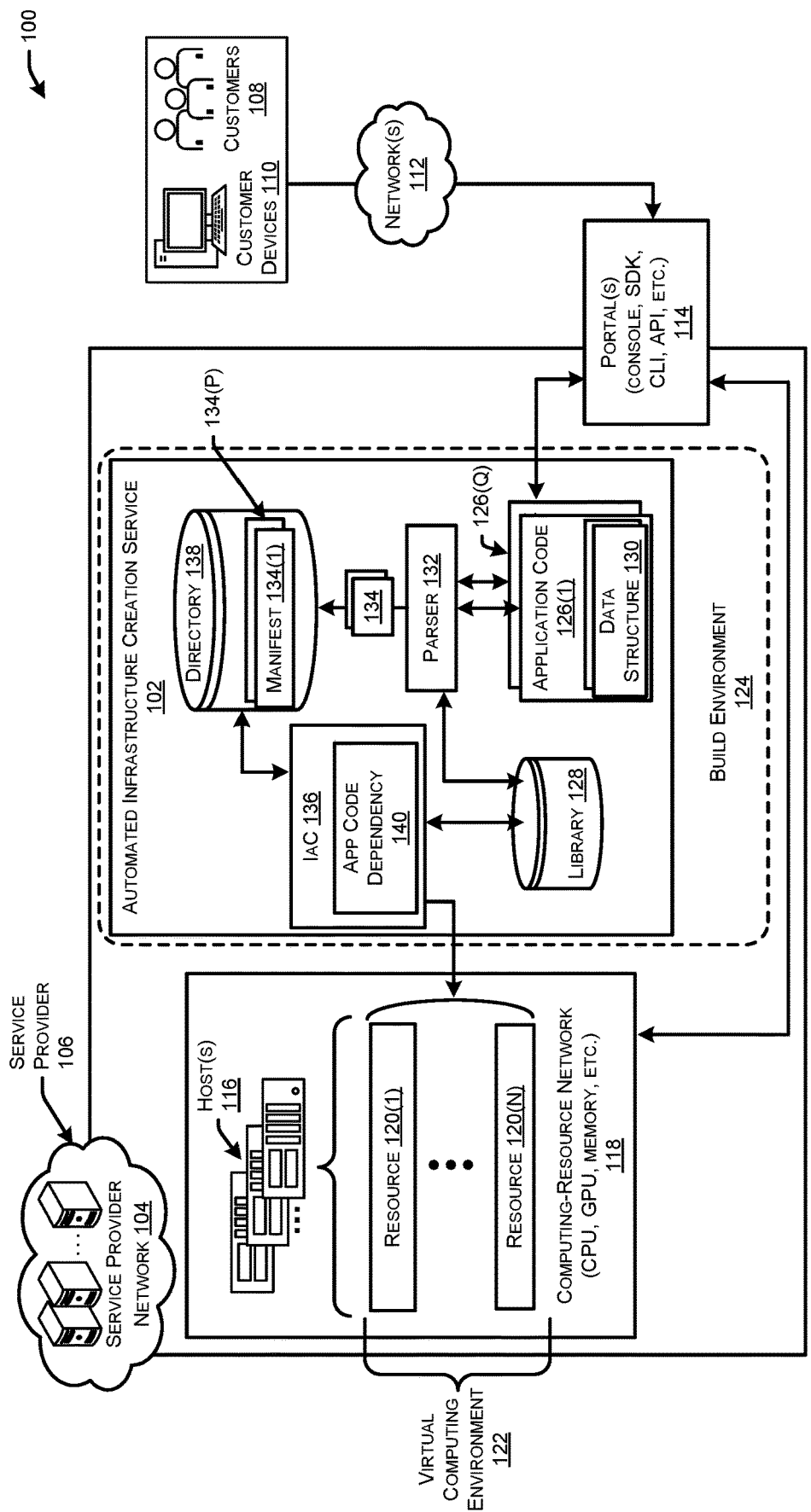
FIG. 1 illustrates a system-architecture diagram of an example environment in which an automated infrastructure creation service can be implemented to create infrastructure based on application code.

Service providers offer various network-based (or "cloud-based") services to users to fulfill computing needs of the users. These service providers may operate service provider networks that include clusters of managed servers stored in data centers located across different geographic regions. In this way, users who have subscribed for use of the network-based services (sometimes referred to herein as "customers," or "subscribers") need not invest in and maintain the computing infrastructure required to implement the various services that they may need. Additionally, customers (and sometimes their clients) are able to access these network-based services over different geographic regions. To offer these network-based services across geographic areas, service providers operate and maintain service provider networks (e.g., cloud-based computing environments, network-based service architectures, network-based service infrastructures, etc.). In this way, service provider networks may provide customers with scalable, on-demand, and network-accessible computing platforms over large geographic regions such that the customers have readily-available computing resources at their disposal. These service provider networks allow customers to immediately have computing infrastructure over large geographic regions to fulfill individual computing needs of the customer, and also to provide computing resources to support services provided to clients of the customers.

For example, a customer of the service provider network may be an individual, company, and/or other organization that has an online service that they would like to provide to clients who desire to access the online service. However, the customer may desire to provide access to their online service to clients over large geographic regions, and for a large number of users. The amount of computing infrastructure (e.g., compute power, memory, storage networking, security, etc.) used to support and maintain such an online service over different geographic regions may be large enough to be impractical for customers, particularly new or emerging businesses, to purchase and maintain on their own.

Accordingly, service provider networks may provide services, such as compute services, to fulfill the computing-service needs of the customer. IaC is used to programmatically create infrastructure for a virtual computing environment of the service provider network to provide such services. For example, when the IaC is executed, virtual computing resources can be created to fulfill the computing-service needs of the customer. To illustrate, groups, or "fleets," of virtual machine (VM) instances (sometimes shortened herein to "instances"), database resources, and the like can be created (e.g., configured and deployed) to provide compute capacity, database tables, and the like within the service provider network. The customer can then write application code for an application that uses the infrastructure created by the IaC. However, as noted above, there is often duplication in this process, which is inefficient and error prone due to separate, independent resource descriptions in separate code bases; namely, the IaC and the application code.

This disclosure describes, among other things, techniques and systems for using IaC to automatically create infrastructure for a virtual computing environment of a service provider network based on application code. An example process may identify a data structure(s) in application code, the application code to be executed in a virtual computing environment of a service provider network. The process may further generate a manifest(s) based on the data structure(s) identified in the application code. IaC can then be executed to create infrastructure for the virtual computing environment based at least in part on the manifest(s). Accordingly, the IaC uses the application code to create infrastructure. Said another way, this disclosure provides an IaC description of an infrastructure that is derivable from the usage of a computing resource(s) observed in the application code. The IaC includes a dependency on the application code such that the execution of the IaC causes infrastructure to be created, as specified in the application code.

The techniques described herein for using IaC to create infrastructure for a virtual computing environment of the service provider network based on application code reduces, if not eliminates, the risk of errors in, and/or the risk of inconsistencies between, application code and IaC. This is because the creation of infrastructure via the IaC is driven by the application code, as opposed to a developer independently providing descriptions of a computing resource(s) in multiple, different code bases. The techniques described herein also eliminate the duplication described herein, which makes the process of creating infrastructure via IaC more efficient.

To illustrate, consider an example where a developer writes application code that uses a database resource (e.g., a database table) of a network-based database service provided by a service provider network. For example, a customer of the service provider network may be a company that plans to provide an application as a service to its clients over large geographic regions, and for a large number of users. A developer at the company may write the application code for the application, and the application code may use a database resource. For example, the application code may include one or more data structures that are usable to interact with cloud-based resources, including the database resource. For instance, a data structure included in the application code may be usable to populate the database resource (e.g., a database table) with database contents.

In this example, the disclosed automated infrastructure creation service may process the application code to identify, within the application code, a data structure(s) that is usable to interact with a cloud-based resource during execution of the application code in a virtual computing environment. The automated infrastructure creation service can then generate a manifest(s) based at least in part on the identified data structure(s). A manifest, in this example, may describe a database resource (e.g., a database table) used in the application code. For example, the manifest may specify attributes (or properties, configurations, etc.) of the database table, such as a hash key, a sort key, a range key, a table name, an index, and/or a combination thereof. In this way, the IaC can determine, from the attributes specified in the manifest, how to configure the database table, and may create the database table according to the specified attributes. The IaC may be configured to access the manifest based on an application code dependency included in the IaC. In this way, infrastructure including the database resource can be created automatically based on the application code to reduce, if not eliminate, duplicity in the process of developing IaC and application code, and to mitigate errors in the respective code bases.

While the aforementioned example and many other examples described herein pertain to a database resource, it is to be appreciated that the techniques may be applied with respect to any type of computing resource, such as the creation of VM instances, storage containers, networking resources, queues, and so on. Also described herein are systems and devices comprising one or more processors and one or more memories, as well as non-transitory computer-readable media storing computer-executable instructions that, when executed by the one or more processors, cause performance of various acts and/or processes disclosed herein. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an automated infrastructure creation service 102 can be implemented to create infrastructure based on application code. As illustrated, a service provider network 104 may be operated and/or managed by a service provider 106. The service provider network 104 may provide various services to users to fulfill their computing resource needs, such as cloud-based computing resources. For example, the service provider network 104 may provide cloud-based, scalable, and network accessible (or network-based) compute power services, storage services, database services, networking services, and/or other services.

The service provider network 104 (which may be referred to as a cloud provider network, or sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To utilize the network accessible (or network-based) services, customers 108 may utilize customer devices 110 to register for an account (e.g., a customer account, subscriber account, etc.) with one or more of the network-based services. This may allow the customers 108 (sometimes referred to herein as "subscribers" 108) to subscribe to a network-based service, and to provide their own clients with access to online service(s) without the customers 108 having to invest in the computing resources (e.g., on-premise resources) needed to host their own online services. Generally, the customer devices 110 may comprise any type of computing device that may be utilized to access the service provider network 104. For instance, the customer devices 110 may include, without limitation, laptop computers, desktop computers, tablet computers, server computers, mobile phones (e.g., smartphones), gaming systems (e.g., game consoles), televisions, and/or any computing device usable on its own, or in conjunction with other devices, for accessing the service provider network 104.

Customers 108 may utilize the customer devices 110 to access the service provider network 104 over one or more networks 112 (e.g., the Internet, wireless wide area networks (WANs), personal area networks (PANs), wired and/or wireless local area networks (LANs), etc.). The network(s) 112 may comprise any type of network or combination of networks, including wired and/or wireless networks. In some embodiments, the customers 108 can access one or more network-based services of the service provider network 104 via one or more customer portals 114, such as, without limitation, a web-based console, a software-development kit (SDK), a command-line interface (CLI), an application programming interface (API), and/or any other suitable means.

In an illustrative example, the customer 108 may utilize a compute service (e.g., a compute capacity service) of the service provider network 104, which may be fully managed by the service provider 106 and may deploy, operate, and scale compute resources in the cloud-based, or network-based, environment. For example, such a compute service may utilize one or more host computers 116 in a computing-resource network 118 to instantiate one or more computing resources 120, such as VM instances, allocated to the customer 108. These VM instances can be managed by a script, program, and/or application, etc. In some embodiments, the compute service may provide auto-scaling capabilities such that VM instances can be spun up or spun down based on customer demand. Additionally, or alternatively, the customer 108 may utilize a database service of the server provider network 104, which may deploy, operate, and scale computing resources 120 allocated to the customer 108. These are merely example types of network-based services that the customer 108 can utilize, and others (e.g., storage services, networking services, etc.) are contemplated.

The computing-resource network 118 may include data centers that each include one or more computing resources 120. Computing resources 120 may include, without limitation, data processing resources (e.g., VM instances), database resources (e.g., database tables), storage resources (e.g., storage containers), networking resources, queues, etc. FIG. 1 shows computing resources 120(1)-(N) (collectively 120), where "N" is any positive integer. The data centers of the computing-resource network 118 may house the host computers 116 and may be located across disparate geographical regions such that computing resources are available to support functionality for cloud-based services provided by the service provider network 104. The computing-resource network 118 may include various combinations of hardware-based components, such as central processing units (CPU), graphics processing units (GPU), memory, storage, network capacity, security, and/or any other type of hardware-based resource to support cloud-based services, such as a network-based compute service, database service, storage service, etc. In some examples, the computing resource network 118 may further include respective memories that store various firmware-based and/or software-based resources that provide the functionality of the services, such as the computing resources 120.

An individual computing resource 120, or multiple computing resources 120, function(s) as a virtual computing environment 122 for the customer 108. In some examples, a customer 108 may use a preconfigured template to launch a new computing resource 120, such as a machine image that packages bits for use in the deployment of the customer's 108 software/applications, such as an operating system for the VM instance. However, an automated infrastructure creation approach is described herein to reduce, or eliminate duplicity in this process, and/or to mitigate errors in code bases, as described herein. An individual computing resource 120 may be of a particular type, among multiple possible types. In an example of VM instances as the computing resources 120, the VM instances can be defined in terms of CPU, memory, storage, and/or networking capacity. Database resources, storage resources, and/or networking resources can be defined similarly.

FIG. 1 depicts a build environment 124 of the service provider network 104. In general, the build environment 124 facilitates the development (e.g., writing) of source code. For example, a customer 108 may develop (e.g., write) application code 126 (sometimes referred to herein as "service code" 126) for a new application that the customer 108 plans to provide as a service to its clients over large geographic regions, and for a large number of users. The customer 108 may utilize the portal(s) 114 to access the build environment 124, and, within the build environment 124, the customer 108 (e.g., a software developer) may compile all, or a portion, of the application 126 to determine if there are any bugs in the application code 126. In some examples, the customer 108 can run scripts within the build environment 124 and the application code 126 that is being built can populate build artifacts in order to validate the application code 126 prior to running the application code 126 in the virtual computing environment 122 for use by the customer's 108 clients. FIG. 1 depicts multiple instances of application code 126(1)-(Q) (collectively 126), where "Q" is any positive integer. Each instance of application code 126 depicted in FIG. 1 may correspond to a different application that the customer 108 plans to deploy for its clients.

During build time for a particular application code 126, the customer 108 may use a library 128 to describe one or more data structures 130 (sometimes referred to herein as "objects 130"). In an example where the application code 126 uses a database resource of a database service, an illustrative example of the library 128 used to describe the data structure(s) 130 is DynamoDB mapper, which is provided by the Amazon Web Services (AWS) software development kit (SDK) for Java. In this example, during build time, the customer 108 may describe a data structure(s) 130 in the application code 126 by configuring indexes (e.g., global indexes, secondary indexes, local indexes, etc.), a primary hash key, a sort key, a range key, and/or any other suitable attribute of the database resource (e.g., a database table). Accordingly, the data structure 130 is usable to interact with a cloud-based resource(s) (or, network-based resource(s), remote resource(s), etc.) during execution of the application code 126 in the virtual computing environment 122. The data structure 130 may also indicate that there is a computing resource(s) 120 that is/are to be provisioned in the virtual computing environment 122. At build time, in the process of describing a data structure(s) 130 in the application code 126, various attributes of a computing resource(s) 120 (e.g., a database resource, VM instance, etc.) are specified in the application code 126 so that the application code 126 can use the computing resource(s) 120 at runtime. The library 128 represents source of information that a developer can use to describe a data structure(s) 130 where such resource attributes are labeled or defined. In some examples, when the application code 126 is executed at runtime within the virtual computing environment 122, the data structure(s) 130 in the application code 126 is/are usable to interact with a cloud-based resource, and, in the example of a database service, the data structure(s) 130 may be usable to interact with a database resource(s) based on the attributes (e.g., index, hash key, sort key, range key, etc.) of the database resource(s). Accordingly, the data structure(s) 130 are implemented in the application code 126 at build time.

Figure 2:
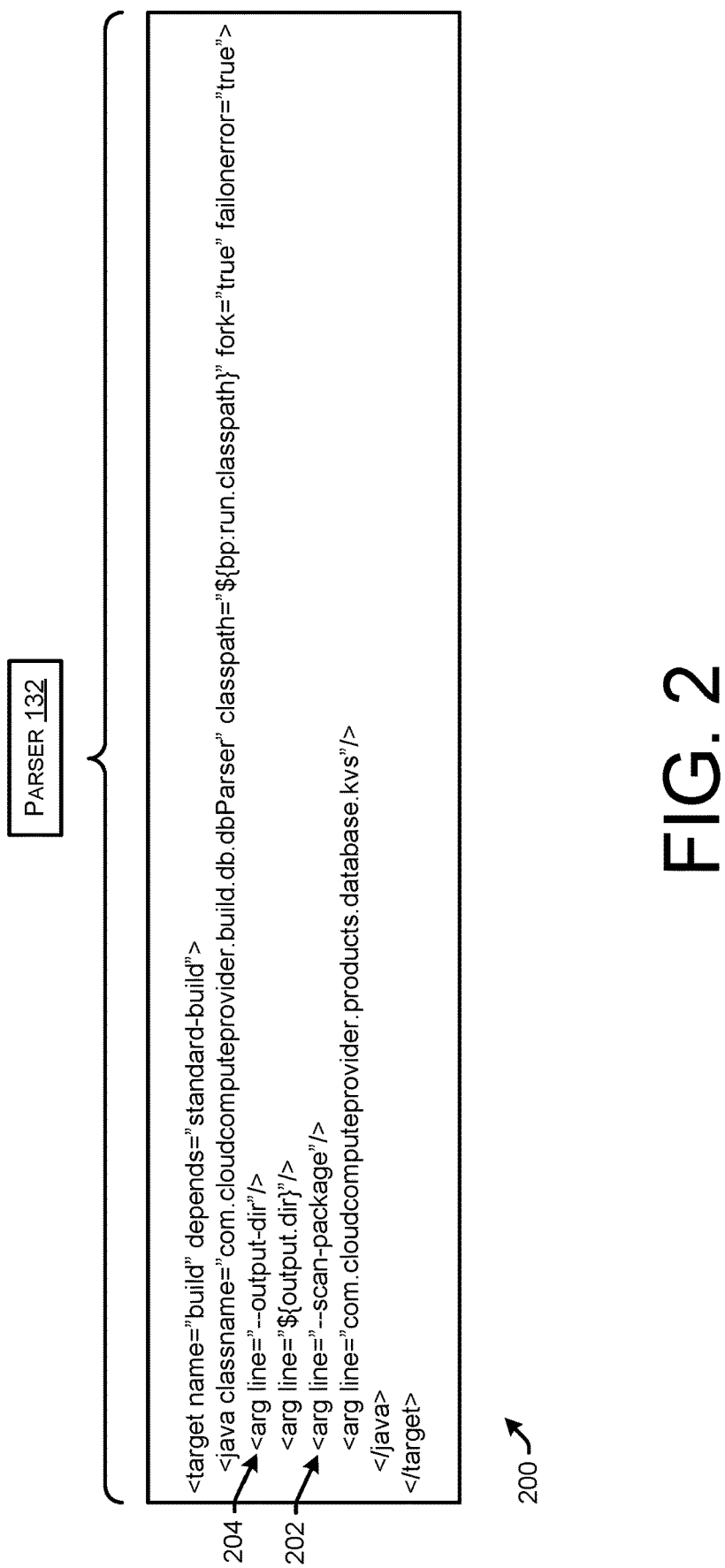
FIG. 2 illustrates example code for a parser of the automated infrastructure creation service, the parser being configured to generate a manifest(s) based on a data structure(s) identified in application code.

In the example of FIG. 1, the automated infrastructure creation service 102, which can be implemented within the build environment 124, includes a parser 132 (or "parser component" 132). An example of the parser 132 is shown in FIG. 2. In general, the parser 132 is configured to process (e.g., receive as input, parse, scan, analyze, etc.) the application code 126 to identify (e.g., detect, observe, etc.) data structures 130 in the application code 126. In some examples, the parser 132 uses (e.g., references) the library 128 to identify data structures 130 within the application code 126. In the running example, the parser 132 may identify a data structure 130 that is associated with a database resource (e.g., a database table) with various attributes (e.g., index, hash key, sort key, range key, etc.) defined in the application code 126. Once a data structure(s) 130 is/are identified in the application code 126, the parser 132 may analyze the identified data structure(s) 130 to generate a manifest(s) 134. The parser 132 may generate multiple manifests 134(1)-(P) (collectively 134), where "P" is any positive integer. In some examples, one manifest 134 is generated for each data structure 130 (or associated computing resource 120) identified in the application code 126. Therefore, multiple manifests 134 can be generated for an individual instance of application code 126, or application code package.

Figure 3:
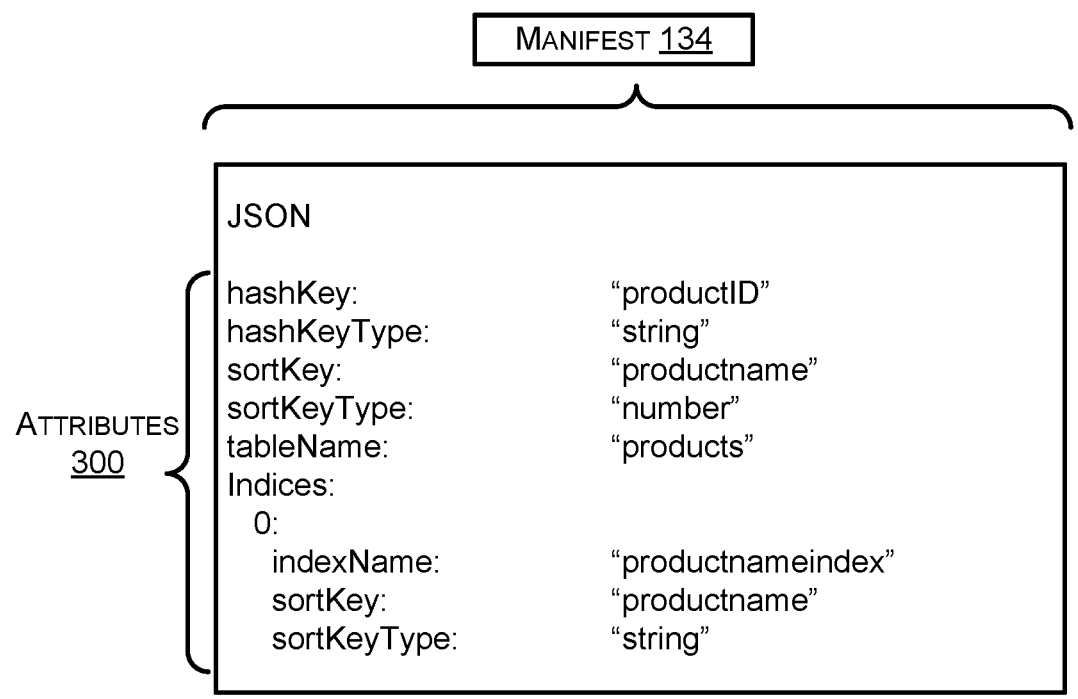
FIG. 3 illustrates an example manifest generated by the parser of the automated infrastructure creation service.

An example of a manifest 134 is shown in FIG. 3. In general, an individual manifest 134 describes a computing resource 120 used in the application code 126. In the running example, a manifest 134 may describe a database resource (e.g., a database table) used in the application code 126. For example, the manifest 134 may specify attributes of the computing resource 120, such as, for a database table, an index, a hash key, a sort key, a range key, a table name, and/or any other suitable database table attribute. In some examples, the parser 132 serializes the attributes of a computing resource 120 used in the application code 126 at build time and includes the serialized resource attributes in the manifest 134 for the particular resource 120. In some examples, multiple resources 120 associated with data structures 130 identified in the application code 126 are serialized at build time and included in one or more manifests 134. In some examples, an individual manifest 134 is a JavaScript Object Notation (JSON) file.

The parser 132 can make the generated manifests 134 available to IaC 136 by exporting (e.g., writing, saving, outputting, etc.) the generated manifest(s) 134 to a directory 138. The directory 138 may represent a location within a file system, such as a folder(s) where manifests 134 can be saved and later retrieved by IaC 136 that is executed. In some examples, the application code 126 includes build artifacts, and a manifest 134 is saved, at build time, as part of the build artifact of the application code 126.

Figure 4:
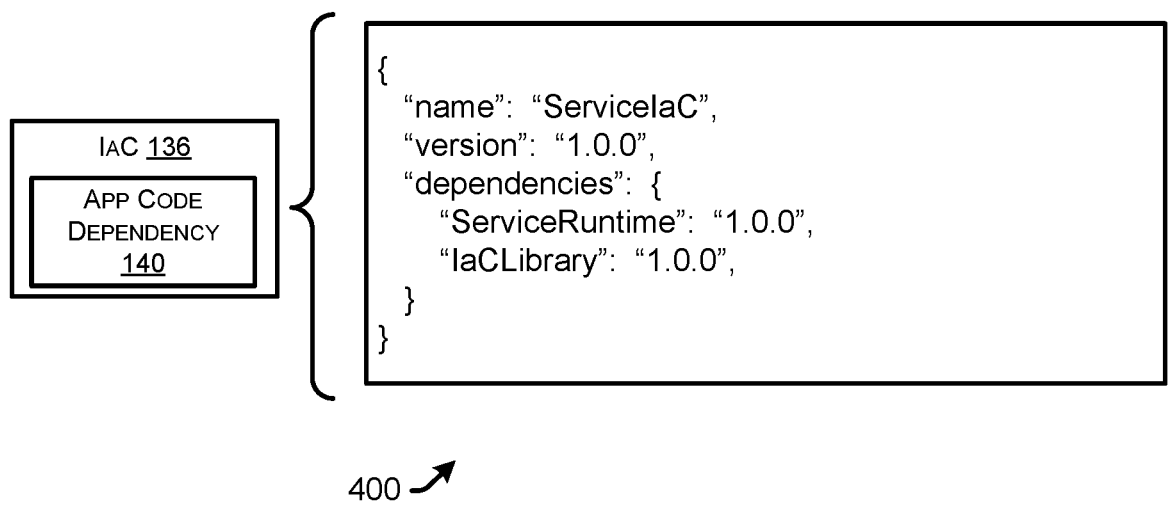
FIG. 4 illustrates example IaC that is executable to create infrastructure for a virtual computing environment base on a manifest(s).

With the manifest(s) 134 accessible to the IaC 136 from the directory 138, the IaC 136 may be executed to create (e.g., build, generate, configure, provision, deploy, etc.) infrastructure for the virtual computing environment 122 based at least in part on a manifest(s) 134. The IaC 136 can represent IaC that is built using any suitable tool. Example tools that may be used to build the IaC 136 include, without limitation, AWS Cloud Development Kit (CDK), or Terraform from HashiCorp. In some examples, a manifest(s) 134 may be accessed from the directory 138 based on an application code dependency 140 included in the IaC 136. In other words, one or more dependencies 140 on application code 126 are included in the IaC 136, and the IaC 136, when executed, determines a dependency it has on the application code 126, such as by identifying an application code package included in the IaC 136, and then the IaC 136 accesses the manifest(s) 134 associated with the application code 126 by reading the manifest(s) 134 from the directory 138. An example of an IaC 136 that includes an application code dependency 140 is shown in FIG. 4.

In some examples, in addition to using the manifest(s) 134, the IaC 136 uses the library 128 to create infrastructure. The infrastructure created by the IaC 136 may include one or more computing resources 120 that are used in the application code 126. In other words, execution of the IaC 136 may cause resources 120 used in the application code 126 to be created. In some examples, the IaC 136 declares which resources 120 are to be created. In the context of the present disclosure, this is done automatically based on processing the application code 126. For example, based on a manifest 134 accessed from the directory 138, and possibly using the library 128 as an additional reference, the IaC 136 can determine how to configure the computing resource(s) 120 that are to be used by application code 126, and the IaC 136 may create the resource 120 according to the configuration specified in the application code 126. In some examples, resource definitions of the IaC 136 are determined dynamically based on the manifest(s) 134. For instance, an individual manifest 134 may specify attributes (e.g., parameters, properties, configurations, programming language, schema, etc.) of a computing resource 120 used in the application code 126. The attributes specified in the manifest 134 allow the IaC 136 to properly configure the resource 120 when the resource 120 is created so that the application code 126 can use the resource 120 at runtime within the virtual computing environment 122. In the running example, the IaC 136 may automatically create a database resource (e.g., a database table) for the virtual computing environment 122 based on a manifest 134 that was generated for particular application code 126 so that the application code 126 (or a corresponding application) can use the properly-configured database resource (e.g., a database table) at runtime within the virtual computing environment 122. In this example, the created database resource adopts the attributes specified in the manifest 134 to operate as a database resource that is usable by the application code 126 within the virtual computing environment 122 for the customer 108 that developed the application code 126.

In some examples, the IaC 136, when executed, creates multiple (e.g., hundreds) of computing resources 120 by reading multiple corresponding manifests 134 from the directory 138 during infrastructure creation. In some examples, the created resources cooperate to provide the infrastructure for an end-to-end computing solution, such as a server or database application developed by a customer 108. In some examples, the automated deployment of resources 120 in the virtual computing environment 122 may involve creating multiple identical computing resources 120 based on an individual manifest 134 to scale up the resources 120 without having redundancy in the manifests 134 stored in the directory 138. In some examples, the number of identical computing resources 120 created per manifest 134 is based on a dimension parameter that indicates a number (e.g., quantity) of identical resources 120 that are to be created.

Additionally, or alternatively, to resource 120 creation, the creation of infrastructure via the IaC 136 may include determining permissions associated with a computing resource(s) 120, such as permissions that an application is to have in order to use the resource(s) 120. For example, within application code 126, an entity may be configured to add data to a database resource. From this description in the application code 126 (e.g., as exhibited in the manifest 134 associated with the application code 126), the IaC 136 can derive permissions for infrastructure creation. In an illustrative example, application code 126 may describe writing data to a storage container (a computing resource 120), and the manifest 134 for that storage container can include permissions (e.g., which applications are allowed to write data to the storage container). From this, the IaC 136 may determine permissions for the storage container as part of its infrastructure creation for the virtual computing environment 122. Infrastructure creation via the IaC 136 can additionally, or alternatively, include determining connections and/or interfaces between computing resources 120, determining security groups to be applied to computing resources 120, etc. In an example, infrastructure creation via the IaC 136 may include creating a VM instance configured as a web server having a software application installed thereon, creating a database table associated with the web server, creating a storage container for storage of user data, determining permissions that the software application has in order to write data to the storage container, and/or determining a security group to be applied to the web server to allow public device connections and secure connections over respective ports, and to deny all other connections.

FIG. 2 illustrates example code 200 for a parser 132 of the automated infrastructure creation service 102, the parser 132 being configured to generate a manifest(s) 134 based on a data structure(s) 130 identified in application code 126. The code 200 in FIG. 2 is configured to "hijack" a build target, but this is merely an example of how the parser 132 can be implemented. The parser 132 is configured to process (e.g., receive as input, parse, scan, analyze, etc.) the application code 126 to identify (e.g., detect, observe, etc.) data structures 130 in the application code 126. Accordingly, in the example, of FIG. 2, the arg 202 causes the parser 132 to process (e.g., scan) an application code package to identify data structures 130 in the application code package.

Once a data structure(s) 130 is/are identified in the application code 126, the parser 132 may analyze the identified data structure(s) 130 to generate a manifest(s) 134, which is exported to a directory 138 based at least in part on the build path arg 204 in the code 200 depicted in FIG. 2. Using the example code 200 of FIG. 2, the manifest(s) 134 may be exported as a JSON file(s), and the exported JSON file(s) is accessible to the IaC 136 for automated infrastructure (e.g., computing resource 120) creation.

FIG. 3 illustrates an example manifest 134 generated by the parser 132 of the automated infrastructure creation service 102. The example manifest 134 is generated based on an identified data structure 130 that is associated with a database resource (e.g., a database table) used in application code 126. It is to be appreciated, however, that manifests 134 can be generated for other types of resources, such as VM instances, storage containers, etc. Further, in the example of FIG. 3, the manifest 134 is in the form of a JSON file, but his is merely exemplary.

The manifest 134 depicted in FIG. 3 specifies attributes 300 of a computing resource 120, which, in this example, is a database resource (e.g., a database table) used in application code 126. The attributes 300 specified in the manifest 134 allow the IaC 136 to properly configure the resource 120 when the resource 120 is created so that the application code 126 can use the resource 120 at runtime within the virtual computing environment 122. In the example of FIG. 3, the attributes 300 of the database table include, without limitation, a hash key, a hash key type, a sort key, a sort key type, a table name, and indices. For other types of computing resources 120, the attributes 300 may be different. For example, a queue resource used by application code 126 with respect to a network-based queue service may have attributes 300 that include, among other attributes, a queue name and a schema. The attributes 300 for a storage container or a VM instance may be particular to those types of resources 120 as well.

FIG. 4 illustrates example IaC 136 that is executable to create infrastructure for a virtual computing environment 122 base on a manifest(s) 134. The example IaC 136 shown in FIG. 4 is built using AWS CDK, but this is merely an example tool that can be used to build the IaC 136. Particularly, the IaC 136 includes one or more application code dependencies 140 (e.g., a Service IaC "package.json" dependency file 400) that result in accessing a corresponding manifest(s) 134 from the directory 138 in order to create the infrastructure for a virtual computing environment 122. This application code dependency 140 in the IaC 136 allows the IaC 136 to determine a handle that points to the location where the corresponding manifest(s) 134 is stored (e.g., the directory 138), and the manifest(s) 134 provides the information to the IaC 136 regarding how to configure particular resources 120 used by application code 126, which permissions to set, and so on.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
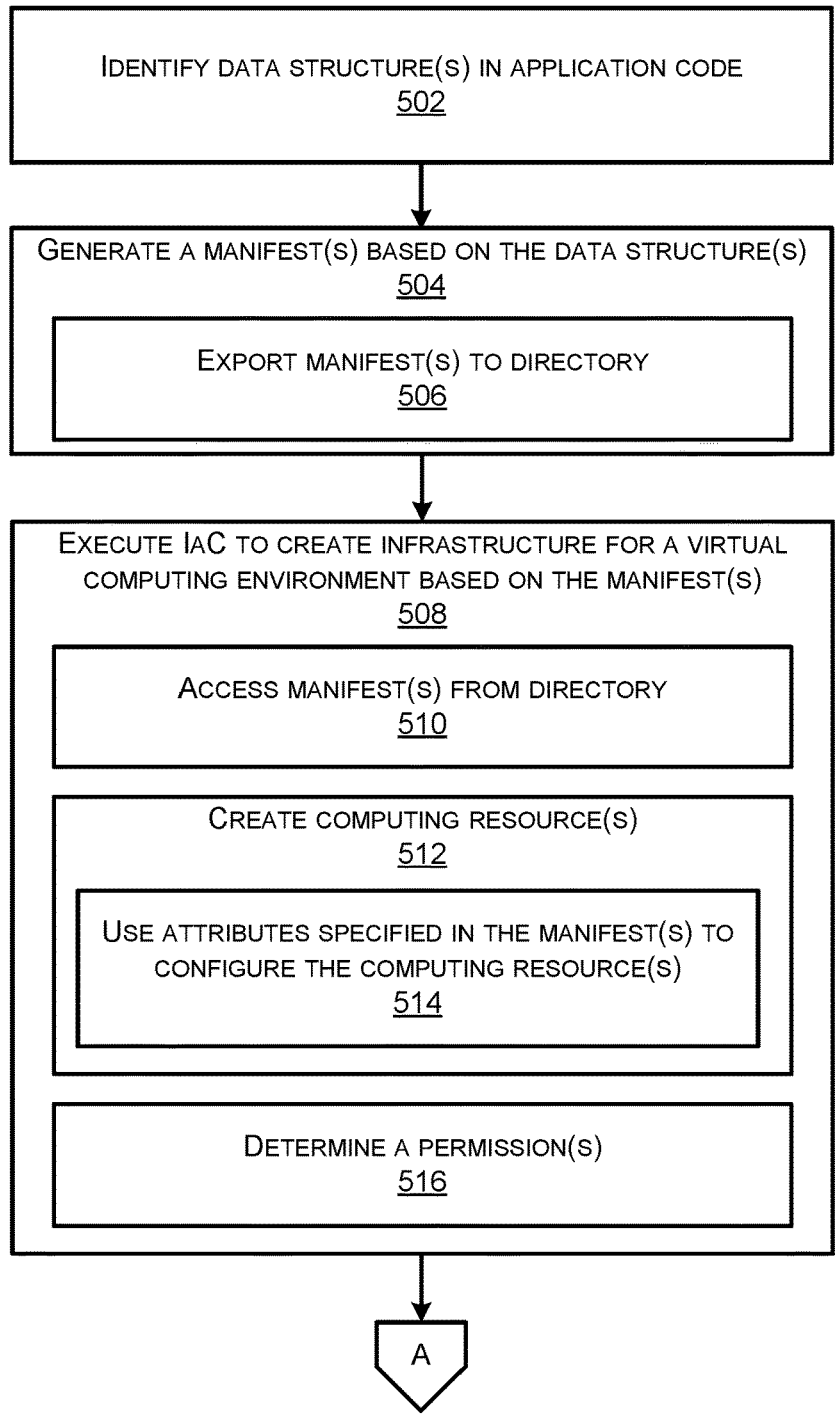
FIG. 5 illustrates a flow diagram of an example process for creating infrastructure for a virtual computing environment based on application code, according to an embodiment.

FIG. 5 illustrates a flow diagram of an example process 500 for creating infrastructure for a virtual computing environment 122 based on application code 126, according to an embodiment. For discussion purposes, the process 500 is described with reference to the previous figures.

At 502, a processor(s) of a service provider network 104 may identify a data structure(s) 130 in application code 126, the application code 126 to be executed in a virtual computing environment 122 of the service provider network 104. For example, a customer 108 may have developed (e.g., written) application code 126 for an application the customer 108 plans to provide as a service to its clients over large geographic regions, and for a large number of users. In some examples, the application is configured to access a network-based service of the service provider network 104, such as a database service, a compute service (or data processing service), a storage service, a queue service, a networking service, or the like. In some examples, a library 128 may be used at block 502 to identify the data structure(s) 130 within the application code 126. In some examples, the data structure(s) 130 identified in the application code 126 at block 502 is/are usable to interact with a cloud-based resource during execution of the application code 126 in the virtual computing environment 122. For example, a data structure 130 identified at block 502 may be usable to interact with a database resource (e.g., a database table), such as by populating the database resource with database contents. In this example, the data structure 130 is associated with a database resource (e.g., a database table) with various attributes (e.g., index, hash key, sort key, range key, etc.) defined in the application code 126.

At 504, the processor(s) of a service provider network 104 may generate a manifest(s) 134 based at least in part on the data structure(s) 130 identified at block 502. For example, the manifest(s) 134 may be generated based on analyzing the data structure(s) 130 identified at block 502. In some examples, a manifest 134 generated at block 504 describes a computing resource 120 used in the application code 126. For example, a manifest 134 generated at block 504 may describe a database resource (e.g., a database table), a VM instance, a storage resource (e.g., a storage container), a queue, a networking resource, or the like. In some examples, multiple manifests 134 are generated at block 504 based on multiple data structures 130 identified and multiple computing resources 120 used in the application code 126. In this example, each manifest 134 generated may be specific to a particular computing resource 120 used in the application code 126. In some examples, attributes of a computing resource 120 used in the application code 126 at build time are serialized and included in the manifest 134 at block 504. In some examples, an individual manifest 134 is generated at block 504 as a JSON file.

At sub-block 506, the processor(s) of a service provider network 104 may export the manifest(s) 134 to a directory 138. The directory 138 may represent a location within a file system, such as a folder(s) where manifests 134 can be saved and later retrieved by IaC 136. In some examples, the application code 126 includes build artifacts, and a manifest 134 is saved, at sub-block 506 during build time, as part of the build artifact of the application code 126.

At 508, the processor(s) of a service provider network 104 may execute IaC 136 to create infrastructure for the virtual computing environment 122 based at least in part on the manifest(s) 134 generated at block 504. The IaC 136 executed at block 508 can represent IaC that is built using any suitable tool, as described herein.

At sub-block 510, the processor(s) of a service provider network 104 may access the manifest(s) 134 from the directory 138 based on an application code dependency 140 included in the IaC 136. In other words, one or more dependencies 140 on application code 126 are included in the IaC 136, and the IaC 136, when executed at block 508, determines a dependency it has on the application code 126, such as by identifying an application code package included in the IaC 136, and then the IaC 136, at sub-block 510, accesses the manifest(s) 134 associated with the application code 126 by reading the manifest(s) 134 from the directory 138. In some examples, the IaC 136 uses the library 128 to create infrastructure at block 508 based on a manifest(s) 134.

The infrastructure created by the IaC 136 may include one or more computing resources 120 that are used in the application code 126. Accordingly, at sub-block 512, execution of the IaC 136 may cause computing resources 120 used in the application code 126 to be created. For example, the IaC 136 declares which resources 120 are to be created at sub-block 512, but this is done according to the manifest(s) 134 generated at block 504, which may be accessed based on the application code dependency 140 in the IaC 136. In other words, the computing resource(s) 120 is/are created at sub-block 512 automatically based on the application code 126 processed at block 502. For example, based on a manifest 134 accessed from the directory 138, and possibly using the library 128 as a reference, the IaC 136 can determine how to configure the computing resource(s) 120 that are to be used by application code 126, and the IaC 136 may create the resource 120 according to the configuration specified in the application code 126. To illustrate, the IaC 136 may automatically create a database resource (e.g., a database table) at sub-block 512 for the virtual computing environment 122 based on a manifest 134 that was generated for particular application code 126 so that the application code 126 (or a corresponding application) can use the properly-configured database resource (e.g., a database table) at runtime within the virtual computing environment 122.

At sub-block 514, the processor(s) of a service provider network 104 may use attributes 300 specified in the manifest (s) 134 to create (e.g., configure) the computing resource(s) 120 created at sub-block 512. For example, a manifest 134 may specify attributes 300 of a database resource (e.g., a database table) such as, without limitation, a hash key, a sort key, a range key, a table name, and/or an index, etc. The IaC 136 can use these attributes 300 to properly configure the database resource at sub-block 514.

In some examples, the creation of infrastructure via the IaC 136 at block 508 may include determining permissions associated with a computing resource(s) 120. Accordingly, at sub-block 516, execution of the IaC 136 may result in the determination of permissions, such as permissions that an application is to have in order to use a computing resource(s) 120. For example, within application code 126, an entity may be configured to add data to a database resource. From this description in the application code 126 (e.g., as exhibited in the manifest 134 associated with the application code 126), the IaC 136 can derive permissions (e.g., identity and access management (IAM) permissions) for infrastructure creation at sub-block 516. In an illustrative example, application code 126 may describe writing data to a storage container (a computing resource 120), and the manifest 134 for that storage container can include permissions (e.g., which applications are allowed to write data to the storage container). From this, the IaC 136 may, at sub-block 516, determine permissions for the storage container as part of its infrastructure creation for the virtual computing environment 122. Additionally, or alternatively, the creation of infrastructure via the IaC 136 at block 508 may include determining a networking configuration(s), such as network ingress rules, network egress rules, etc.

In one example implementation of the process 500, a customer 108 of the service provider network 104 may have developed application code 126 for a new application that uses a database resource of a database service. The process 500 may be implemented to identify a data structure 130 in the application code 126 at block 502, generate a manifest 134 at block 504 that describes the database resource (e.g., by specifying attributes 300 of the database resource), and execute IaC 136 at block 508 to create infrastructure for a virtual computing environment 122 based on the manifest 134. In this example, the infrastructure created at block 508 may include at least the database resource. Further, because the manifest 134 specifies the attributes 300 of the database resource that were derived from analyzing the identified data structure 130, the IaC 136 can properly configure the database resource at the time of its creation using the specified attributes 300. In this way, inconsistencies between the IaC 136 and the application code 126 are eliminated and the customer's 108 application is able to utilize the automatically-created infrastructure in the virtual computing environment 122.

Figure 6:
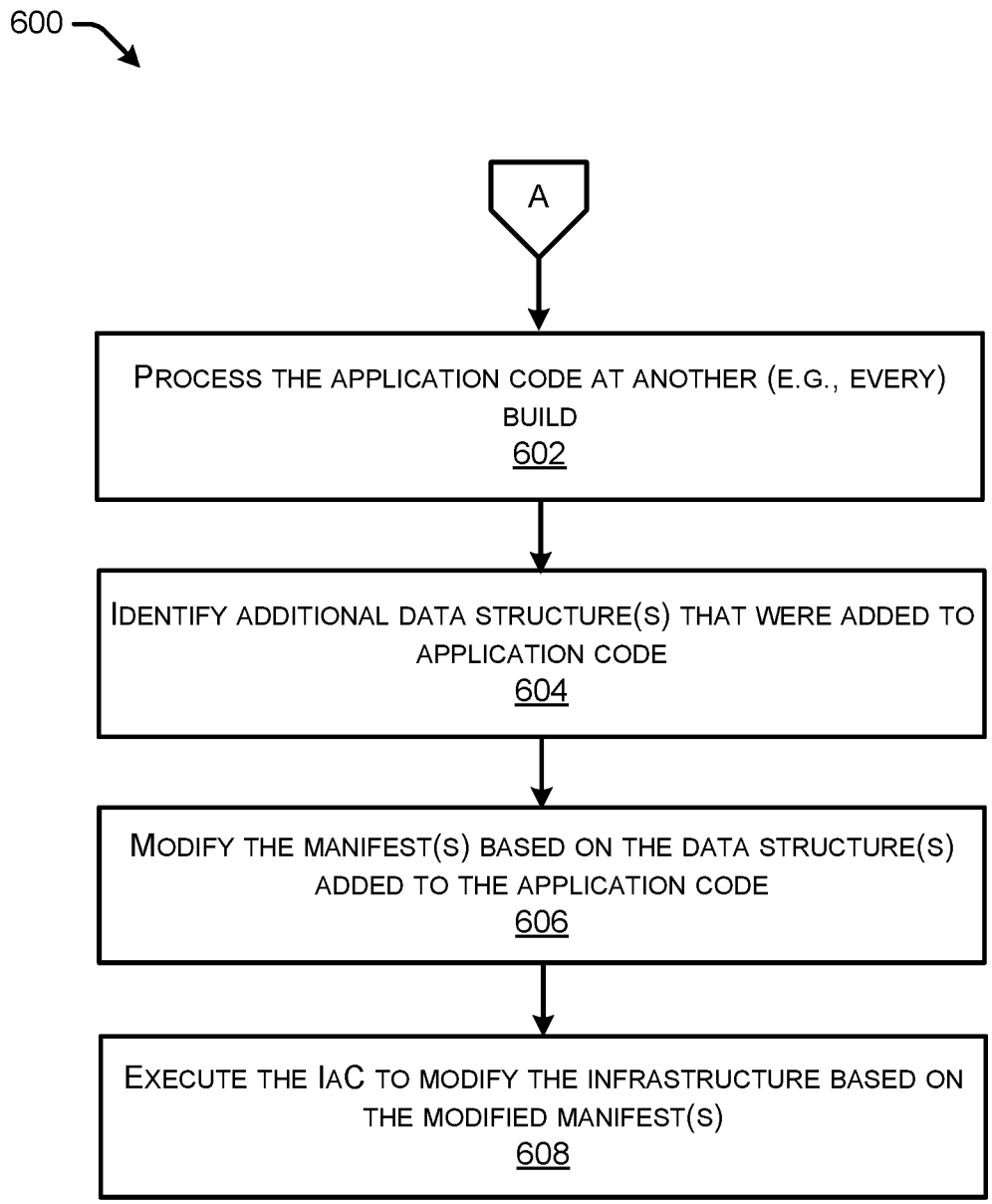
FIG. 6 illustrates a flow diagram of an example process for modifying infrastructure for a virtual computing environment based on one or more data structures added to application code, according to an embodiment.

FIG. 6 illustrates a flow diagram of an example process 600 for modifying infrastructure for a virtual computing environment 122 based on one or more data structures 130 added to application code 126, according to an embodiment. As shown by the off-page reference "A" in FIGS. 5 and 6, the process 600 may continue from block 508 of the process 500, after the infrastructure is created based on processing the application code 126 during the process 500. For discussion purposes, the process 600 is described with reference to the previous figures.

At 602, a processor(s) of a service provider network 104 may process the application code 126 at another build. For example, the application code 126 may have been processed at a first build during the process 500, and the application code 126 may be processed at a second build at block 602, after the first build. In some examples, the application code 126 is processed at every build where the customer 108 further develops the application code 126 within the build environment 124. In an illustrative example, the application code 126 may be processed by the parser 132 at block 602.

At 604, during this subsequent (e.g., second) pass through the application code 126, the processor(s) of the service provider network 104 may identify one or more additional data structures 130 (e.g., a second data structure 130) that was/were added to the application code 126 after the first build when the application code 126 was processed during the process 500. In an illustrative example, a developer may modify the application code 126, such as by adding to the application code 126. In an example, the developer may add another computing resource 120 used by the application code 126, and may use the library 128 to describe a data structure 130 associated with that computing resource 120.

At 606, the processor(s) of the service provider network 104 may modify the manifest(s) 134 generated at block 504 of the process 500 based on the data structure(s) 130 identified at block 604.

At 608, the processor(s) of the service provider network 104 may execute the IaC 136 to modify the infrastructure created at block 508 of the process 500 based at least in part on the modified manifest(s) 134. In this manner, the infrastructure can be continuously updated and/or refined in response to modifications made to application code 126. This also means that infrastructure can be created immediately for application code 126 that is developed without having to wait until a finalized version of the application code 126 is ready before creating infrastructure via the IaC 136. Accordingly, as the application code 126 evolves, the automated infrastructure creation service 102 is configured to automatically detect a change in the application code 126 and determine how the infrastructure is to be modified at block 608. In some examples, executing the IaC 136 to modify the infrastructure at block 608 may include determining a "delta" (i.e., a difference(s)) between the original (or previously-created) infrastructure and the infrastructure that is to be created based on the modified manifest(s) 134. Using this delta, the modifying of the infrastructure can be limited to the parts of the infrastructure that are to be added, deleted, and/or changed. This avoids a complete re-creation of infrastructure (e.g., deprovisioning the existing infrastructure and creating a new infrastructure in its entirety). In some examples, a delta (i.e., a difference(s)) between sequential versions of the manifest(s) 134 can be identified and used to determine what is to be added, deleted, and/or changed with respect to the existing infrastructure.

In some examples, the process 600 may include sub-blocks similar to the sub-blocks 506, 510, 512, 514, and/or 516 described with reference to the process 500. That is, the process 600 may involve exporting a modified manifest(s) 134 to the directory 138 (e.g., overwriting the previous version(s) of the manifest(s) 134), accessing the modified manifest(s) 134 from the directory 138, creating, deleting, and/or changing a computing resource(s) 120 as part of the infrastructure modification, and/or determining, deleting, and/or changing a permission(s) as part of the infrastructure modification.

Figure 7:
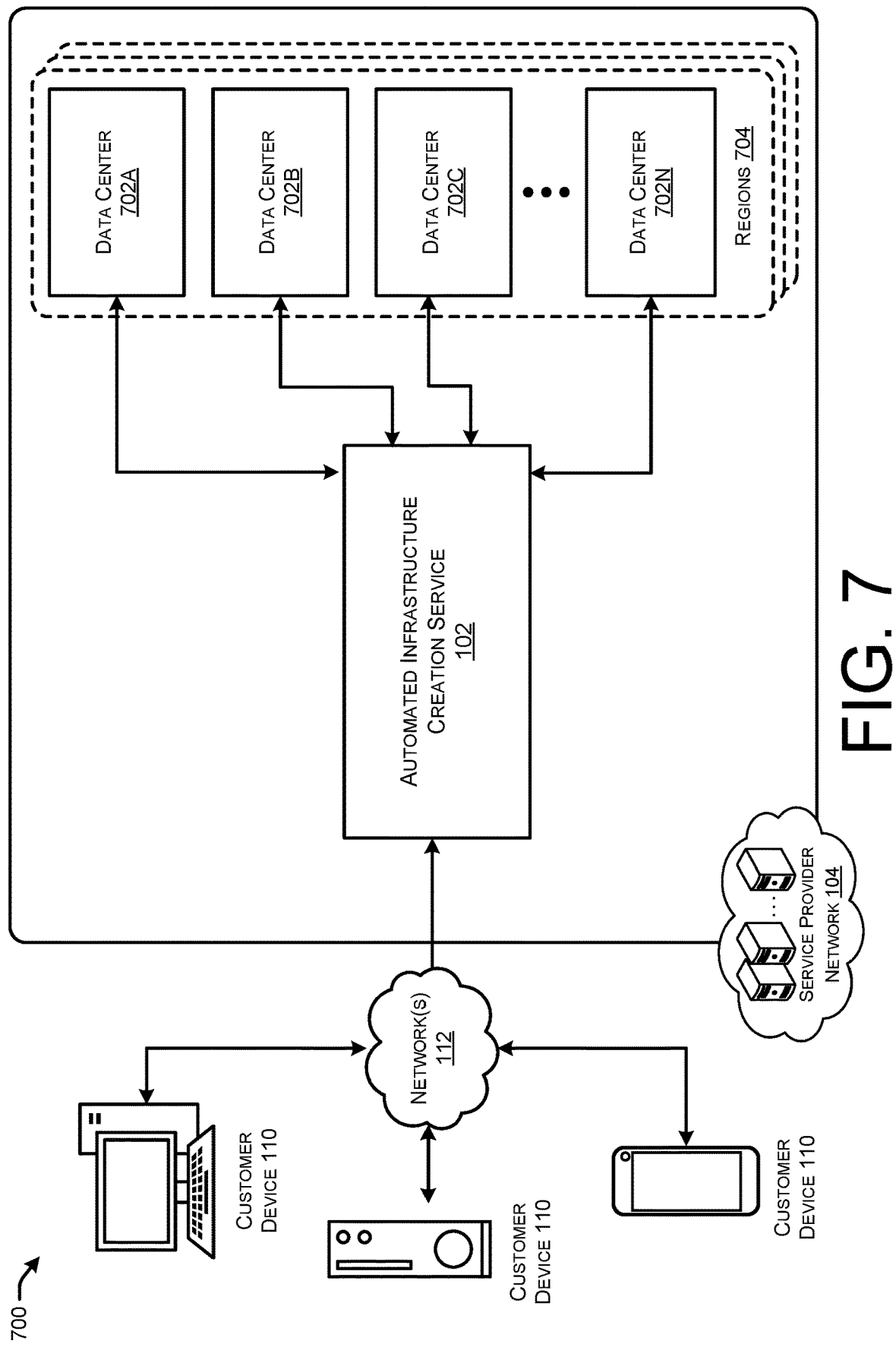
FIG. 7 is a system and network diagram that shows an illustrative operating environment that includes a service provider network that can be configured to implement aspects of the functionality described herein.

FIG. 7 is a system and network diagram that shows an illustrative operating environment 700 that includes a service provider network 104 that can be configured to implement aspects of the functionality described herein. The service provider network 104 can provide computing resources 120, such as data processing resources (e.g., VM instances), database resources (e.g., database tables), storage resources (e.g., storage containers), networking resources, queues, etc. on a permanent or an as-needed basis. Among other types of functionality, the computing resources 120 provided by the service provider network 104 may be utilized to implement the various services and components described above.

Each type of computing resource 120 provided by the service provider network 104 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 104 can also be configured to provide other types of computing resources not mentioned specifically herein.

The computing resources 120 provided by the service provider network 104 may be enabled in one embodiment by one or more data centers 702A-702N (which might be referred to herein singularly as "a data center 702" or in the plural as "the data centers 702"). The data centers 702 are facilities utilized to house and operate computer systems and associated components. The data centers 802 typically include redundant and backup power, communications, cooling, and security systems. The data centers 702 can also be located in geographically disparate locations, or regions 704. One illustrative embodiment for a data center 702 that can be utilized to implement the technologies disclosed herein will be described below with regard to FIG. 8.

The customers 108 that utilize the service provider network 104 may access the computing resources 120 provided by the service provider network 104 over any wired and/or wireless network(s) 112, which can be a wide area communication network ("WAN"), such as the Internet, an intranet or an Internet service provider ("ISP") network or a combination of such networks. For example, and without limitation, a customer device 110 operated by customer 108 of the service provider network 104 may be utilized to access the service provider network 104 by way of the network(s) 112. It should be appreciated that a local-area network ("LAN"), the Internet, or any other networking topology known in the art that connects the data centers 702 to remote clients and other users can be utilized. It should also be appreciated that combinations of such networks can also be utilized. As illustrated, the automated infrastructure creation service 102 may implement the automated creation of infrastructure via IaC 136 based on application code 126, as described herein.

Figure 8:
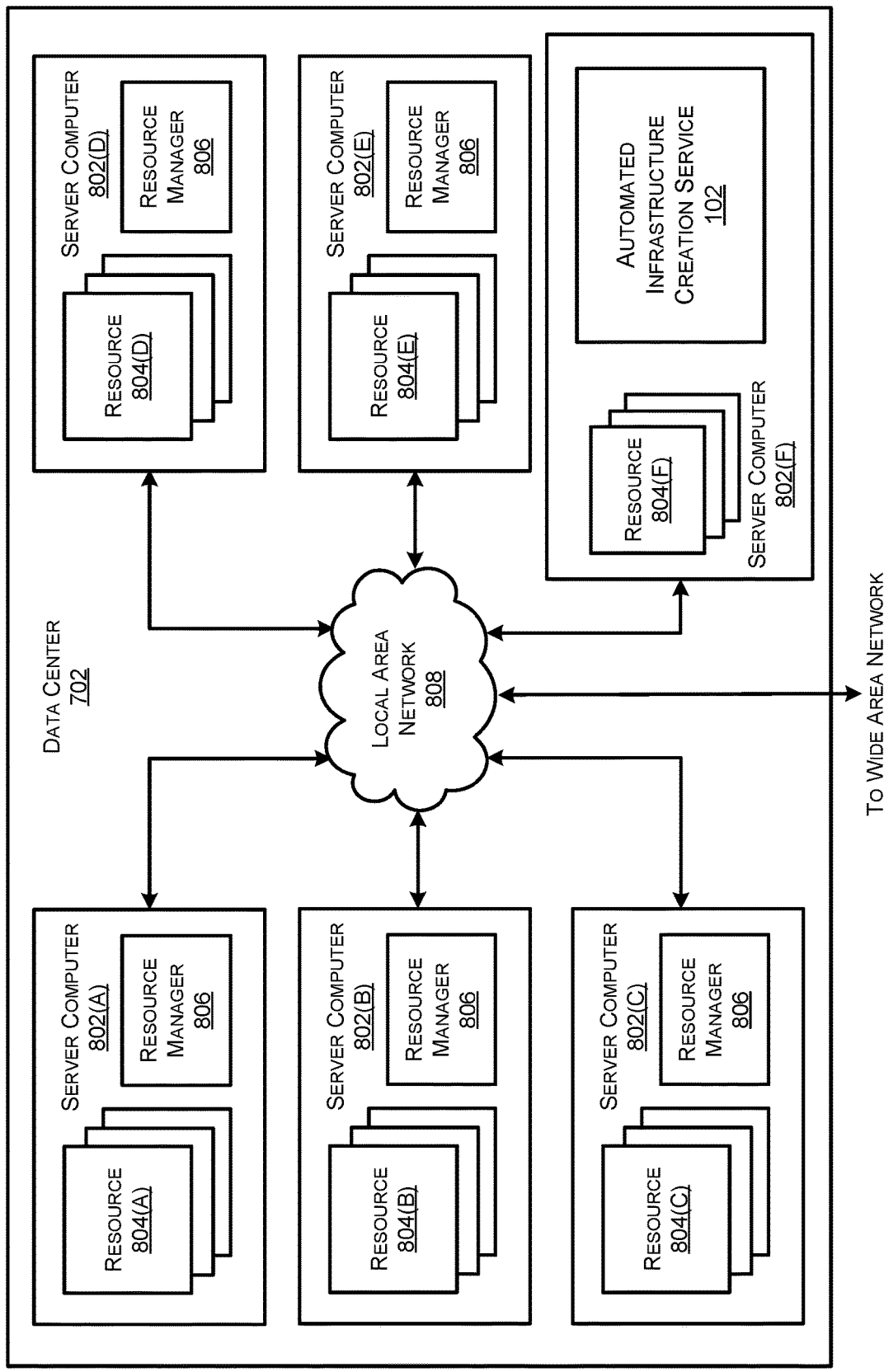
FIG. 8 is a computing system diagram illustrating a configuration for a data center that can be utilized to implement aspects of the technologies disclosed herein.

FIG. 8 is a computing system diagram 800 that illustrates one configuration for a data center 702 that implements aspects of the technologies disclosed herein. The example data center 702 shown in FIG. 8 includes several server computers 802A-802F (which might be referred to herein singularly as "a server computer 802" or in the plural as "the server computers 802") for providing computing resources 804A-804E. In some examples, the resources 804 may represent the computing resources 120 described herein. In some examples, the resources 804 and the server computers 802 may include, be included in, or correspond to, the computing resource network 118 described herein.

The server computers 802 can be standard tower, rack-mount, or blade server computers configured appropriately for providing the computing resources described herein (illustrated in FIG. 8 as the computing resources 804A-804E). The computing resources provided by the service provider network 104 can be virtual computing resources 120 (e.g., data processing resources, such as VM instances, database resources, storage resources, networking resources, queues, etc.) or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 702 can also be configured to provide network services and other types of services.

In the example data center 702 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 702A-702N, between each of the server computers 802A-802F in each data center 702, and, potentially, between computing resources in each of the server computers 802. It should be appreciated that the configuration of the data center 702 described with reference to FIG. 8 is merely illustrative and that other implementations can be utilized.

The data center 702 shown in FIG. 8 also includes a server computer 802F that can execute some or all of the software components described above. For example, and without limitation, the server computer 802F (and the other server computers 802) can generally correspond to a server/computing device configured to execute components including, without limitation, the automated infrastructure creation service 102 that automatically creates infrastructure via IaC 136 based on application code 126, as described herein, and/or the other software components described above. The server computer 802F can also be configured to execute other components and/or to store data for providing some or all of the functionality described herein. In this regard, it should be appreciated that the components illustrated in FIG. 8 as executing on the server computer 802F can execute on many other physical or virtual servers in the data centers 702 in various embodiments. Thus, the data center 702 in FIG. 8 may also include a plurality of server computers 802 that execute a fleet of computing resources (e.g., VM instances). It is to be appreciated that the host computers 116 depicted in FIG. 1 may be any of the servicer computers 802 of FIG. 8. As such, the host computers 116 of FIG. 1 may be within the same data center 702.

Figure 9:
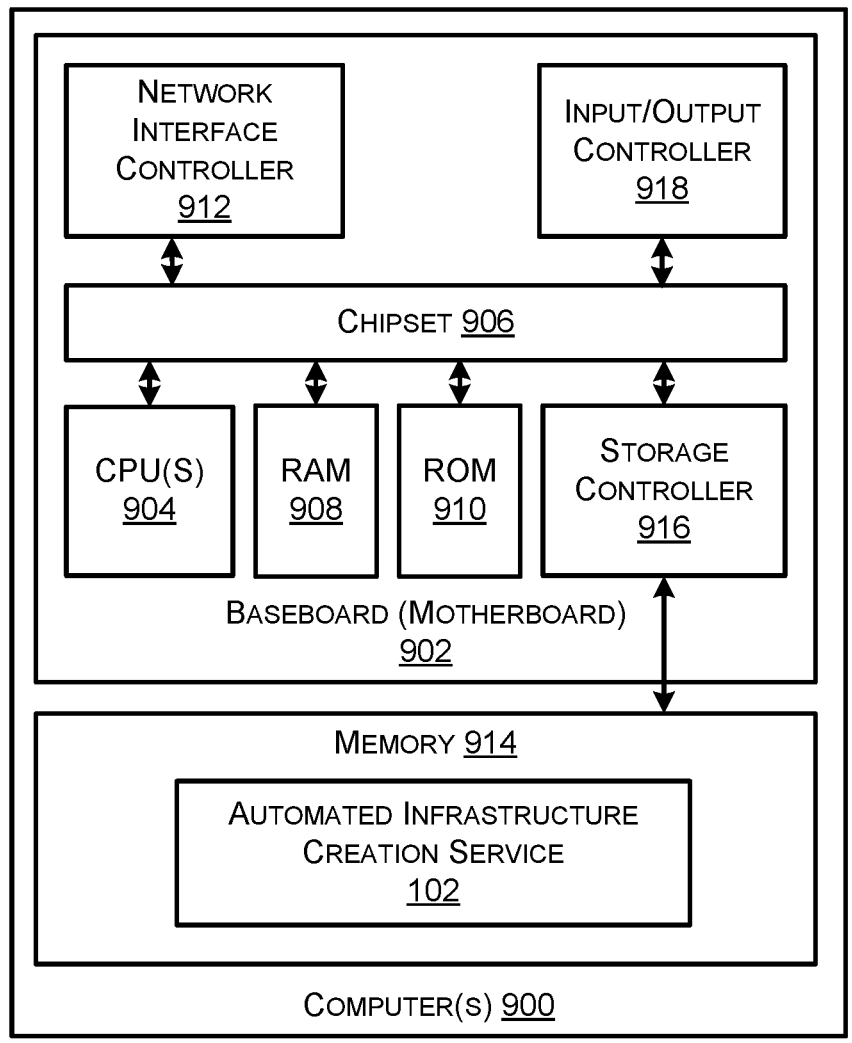
FIG. 9 is a computer architecture diagram showing an illustrative computer hardware architecture for implementing a computing device that can be utilized to implement aspects of the various technologies presented herein.

FIG. 9 shows an example computer architecture for a computer(s) 900 capable of executing program components for implementing the functionality described above. The computer architecture shown in FIG. 9 illustrates a server computer, workstation, desktop computer, laptop, tablet, network appliance, e-reader, smartphone, or other computing device, and can be utilized to execute any of the software components presented herein. In some examples, the server computer(s) 900 may correspond to one or more computing devices that implements the components and/or services described in FIG. 1.

The computer(s) 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer(s) 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a random-access memory (RAM) 908, used as the main memory in the computer(s) 900. The chipset 906 can further provide an interface to a computer-readable storage medium such as a read-only memory ("ROM") 910 or non-volatile RAM ("NVRAM") for storing basic routines that help to startup the computer(s) 900 and to transfer information between the various components and devices. The ROM 910 or NVRAM can also store other software components necessary for the operation of the computer(s) 900 in accordance with the configurations described herein.

The computer(s) 900 can operate in a networked environment using logical connections to remote computing devices and computer systems through a network, such as the network 808. The chipset 906 can include functionality for providing network connectivity through a network interface controller (NIC) 912, such as a gigabit Ethernet adapter. The NIC 912 is capable of connecting the computer(s) 900 to other computing devices over the network 808 (or 112). It should be appreciated that multiple NICs 912 can be present in the computer(s) 900, connecting the computer to other types of networks and remote computer systems.

The computer(s) 900 can be connected to a memory(ies) 914 (e.g., mass storage device, etc.) that provides non-volatile storage for the computer. The memory 914 can store an operating system, programs, and/or components including, without limitation, the automated infrastructure creation service 102 that automatically creates infrastructure via IaC 136 based on application code 126, as described herein, and data, which have been described in greater detail herein. The memory 914 can be connected to the computer(s) 900 through a storage controller 916 connected to the chipset 906. The memory 914 can consist of one or more physical storage units. The storage controller 916 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer(s) 900 can store data on the memory 914 by transforming the physical state of the physical storage units to reflect the information being stored. The specific transformation of physical state can depend on various factors, in different embodiments of this description. Examples of such factors can include, but are not limited to, the technology used to implement the physical storage units, whether the memory 914 is characterized as primary or secondary storage, and the like.

For example, the computer(s) 900 can store information to the memory 914 by issuing instructions through the storage controller 916 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer(s) 900 can further read information from the memory 914 by detecting the physical states or characteristics of one or more particular locations within the physical storage units.

In addition to the memory 914 described above, the computer(s) 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer(s) 900. In some examples, the operations performed by the service provider network 104, and or any components and/or services included therein, may be supported by one or more devices similar to computer(s) 900. Stated otherwise, some or all of the operations performed by the service provider network 104, and/or any components and/or services included therein, may be performed by one or more computer devices 900 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

As mentioned briefly above, the memory 914 can store an operating system utilized to control the operation of the computer(s) 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The memory 914 can store other system or application programs and data utilized by the computer(s) 900.

In one embodiment, the memory 914 or other computer-readable storage media is encoded with computer-executable instructions which, when loaded into the computer(s) 900, transform the computer from a general-purpose computing system into a special-purpose computer capable of implementing the embodiments described herein. These computer-executable instructions transform the computer(s) 900 by specifying how the CPUs 904 transition between states, as described above. According to one embodiment, the computer(s) 900 has access to computer-readable storage media storing computer-executable instructions which, when executed by the computer(s) 900, perform the various processes described above with regard to FIGS. 5-6. The computer(s) 900 can also include computer-readable storage media having instructions stored thereupon for performing any of the other computer-implemented operations described herein.

The computer(s) 900 can also include one or more input/output controllers 918 for receiving and processing input from a number of input devices, such as a keyboard, a mouse, a touchpad, a touch screen, an electronic stylus, or other type of input device. Similarly, an input/output controller 918 can provide output to a display, such as a computer monitor, a flat-panel display, a digital projector, a printer, or other type of output device. It will be appreciated that the computer(s) 900 might not include all of the components shown in FIG. 9, can include other components that are not explicitly shown in FIG. 9, or might utilize an architecture completely different than that shown in FIG. 9.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   non-transitory computer-readable media storing computer-executable instructions that, when executed by the one or more processors, cause the system to:
   identify a data structure in application code, the application code to be executed in a virtual computing environment of a service provider network, wherein the data structure is usable to interact with one or more cloud-based resources during execution of the application code in the virtual computing environment;
   export, based on analyzing the data structure, a manifest to a directory, wherein the manifest describes a computing resource used in the application code;
   access the manifest from the directory based on an application code dependency included in infrastructure as code (IaC); and
   execute the IaC to create infrastructure for the virtual computing environment based on the manifest, wherein the infrastructure includes the computing resource.

2. The system of claim 1, wherein the manifest describes the computing resource by specifying attributes of the computing resource, and wherein executing the IaC to create the infrastructure comprises creating the computing resource using the attributes specified in the manifest.

3. The system of claim 2, wherein the computing resource comprises a database resource, and wherein the attributes specified in the manifest comprise at least one of:
   a hash key;
   a sort key;
   a range key;
   a table name; or
   an index.

4. The system of claim 1, wherein executing the IaC to create the infrastructure comprises determining permissions associated with the computing resource.

5. A method comprising:
   identifying, by one or more processors, a data structure in application code, the application code to be executed in a virtual computing environment of a service provider network;
   generating, by the one or more processors, a manifest based on the data structure; and
   executing, by the one or more processors, infrastructure as code (IaC) to create infrastructure for the virtual computing environment based on the manifest.

6. The method of claim 5, further comprising:
   exporting the manifest to a directory; and
   accessing the manifest from the directory based at least in part on an application code dependency included in the IaC.

7. The method of claim 5, wherein the manifest describes a computing resource used in the application code, and wherein the executing of the IaC to create the infrastructure comprises creating the computing resource.

8. The method of claim 7, wherein the manifest describes the computing resource by specifying attributes of the computing resource, and wherein the creating of the computing resource is based at least in part on the attributes specified in the manifest.

9. The method of claim 8, wherein the computing resource comprises a database resource, and wherein the creating of the computing resource based at least in part on the attributes specified in the manifest comprises using the attributes to configure the database resource in the virtual computing environment.

10. The method of claim 7, wherein the computing resource comprises:
    a database resource;
    a data processing resource;
    a data storage resource;
    a networking resource; or
    a queue.

11. The method of claim 5, wherein the data structure is a first data structure identified by processing the application code at a first build, the method further comprising:
    processing the application code at a second build after the first build;
    identifying a second data structure that was added to the application code after the first build;
    modifying the manifest based at least in part on the second data structure to obtain a modified manifest; and
    executing the IaC to modify the infrastructure based at least in part on the modified manifest.

12. The method of claim 5, wherein the executing of the IaC to create the infrastructure comprises determining one or more permissions associated with a computing resource.

13. A system comprising:
    one or more processors; and
    non-transitory computer-readable media storing computer-executable instructions that, when executed by the one or more processors, cause the system to:
    identify a data structure in application code, the application code to be executed in a virtual computing environment of a service provider network;
    generate a manifest based on the data structure; and
    execute infrastructure as code (IaC) to create infrastructure for the virtual computing environment based on the manifest.

14. The system of claim 13, wherein the computer-executable instructions, when executed by the one or more processors, further cause the system to:
    export the manifest to a directory; and
    access the manifest from the directory based at least in part on an application code dependency included in the IaC.

15. The system of claim 13, wherein the manifest describes a computing resource used in the application code, and wherein executing the IaC to create the infrastructure comprises creating the computing resource.

16. The system of claim 15, wherein the manifest describes the computing resource by specifying attributes of the computing resource, and wherein the creating of the computing resource is based at least in part on the attributes specified in the manifest.

17. The system of claim 16, wherein the computing resource comprises a database resource, and wherein the creating of the computing resource based at least in part on the attributes specified in the manifest comprises using the attributes to configure the database resource in the virtual computing environment.

18. The system of claim 13, wherein the manifest is a JavaScript Object Notation (JSON) file.

19. The system of claim 13, wherein the data structure is a first data structure identified by processing the application code at a first build, and wherein the computer-executable instructions, when executed by the one or more processors, further cause the system to:
- process the application code at a second build after the first build;
- identify a second data structure that was added to the application code after the first build;
- modify the manifest based at least in part on the data structure to obtain a modified manifest; and
- execute the IaC to modify the infrastructure based at least in part on the modified manifest.

20. The system of claim 13, wherein executing the IaC to create the infrastructure comprises determining one or more permissions associated with a computing resource.

\* \* \* \* \*